United States Patent
Laur et al.

(10) Patent No.: US 9,927,810 B1
(45) Date of Patent: Mar. 27, 2018

(54) AUTOMATED-VEHICLE SAFE-STOP-ZONE MAPPING SYSTEM

(71) Applicant: DELPHI TECHNOLOGIES, INC., Troy, MI (US)

(72) Inventors: Michael H. Laur, Mission Viejo, CA (US); Ronald J. Szabo, Noblesville, IN (US); Brian R. Hilnbrand, Mountain View, CA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/268,695

(22) Filed: Sep. 19, 2016

(51) Int. Cl.
*G05D 1/00* (2006.01)
*G08G 1/16* (2006.01)

(52) U.S. Cl.
CPC ............ *G05D 1/0061* (2013.01); *G05D 1/00* (2013.01); *G05D 1/0088* (2013.01)

(58) Field of Classification Search
CPC ............ G05D 1/00; G08G 1/20; G08G 1/205; G08G 1/16
See application file for complete search history.

(56) References Cited

U.S. PATENT DOCUMENTS

| 6,943,701 | B2* | 9/2005 | Zeineh | G01C 21/26 340/903 |
| 8,229,618 | B2* | 7/2012 | Tolstedt | G05D 1/0231 701/23 |
| 9,663,104 | B2* | 5/2017 | Hauler | B60W 30/09 |
| 2003/0016146 | A1* | 1/2003 | Bates | G08G 1/20 340/988 |
| 2005/0060069 | A1* | 3/2005 | Breed | B60N 2/2863 701/408 |
| 2010/0063680 | A1* | 3/2010 | Tolstedt | G05D 1/0214 701/41 |
| 2013/0295872 | A1* | 11/2013 | Guday | H04W 4/22 455/404.1 |
| 2015/0011203 | A1* | 1/2015 | Schrader | H04W 12/08 455/418 |
| 2016/0368491 | A1* | 12/2016 | Hauler | B60T 7/22 |

* cited by examiner

*Primary Examiner* — Yonel Beaulieu
(74) *Attorney, Agent, or Firm* — Lawrence D. Hazelton

(57) ABSTRACT

A safe-stop-zone mapping system suitable for use on an automated-vehicle includes a digital-map and a controller. The digital-map indicates a travel-path suitable for travel by a host-vehicle. The digital-map also indicates a safe-stop-zone proximate to the travel-path. The controller is in communication with the digital-map. The controller is configured to navigate the host-vehicle into the safe-stop-zone when an emergency-situation occurs.

5 Claims, 2 Drawing Sheets

AUTOMATED-VEHICLE SAFE-STOP-ZONE MAPPING SYSTEM

TECHNICAL FIELD OF INVENTION

This disclosure generally relates to a safe-stop-zone mapping system, and more particularly relates to a system configured to navigate a host-vehicle into a safe-stop-zone when an emergency-situation occurs.

BACKGROUND OF INVENTION

Situations arise when it is necessary for a vehicle to pull-over or other-wise stop due to, for example, a medical emergency or mechanical failure in the vehicle. Situations also arise when an autonomous vehicle may require a human-operator to assume manual control of the vehicle, but the operator may not be ready or be capable to take over control because, for example, the operator is incapacitated, the operator lacks skills to operate the vehicle.

SUMMARY OF THE INVENTION

In accordance with one embodiment, a safe-stop-zone mapping system suitable for use on an automated-vehicle is provided. The system includes a digital-map and a controller. The digital-map indicates a travel-path suitable for travel by a host-vehicle. The digital-map also indicates a safe-stop-zone proximate to the travel-path. The controller is in communication with the digital-map. The controller is configured to navigate the host-vehicle into the safe-stop-zone when an emergency-situation occurs.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
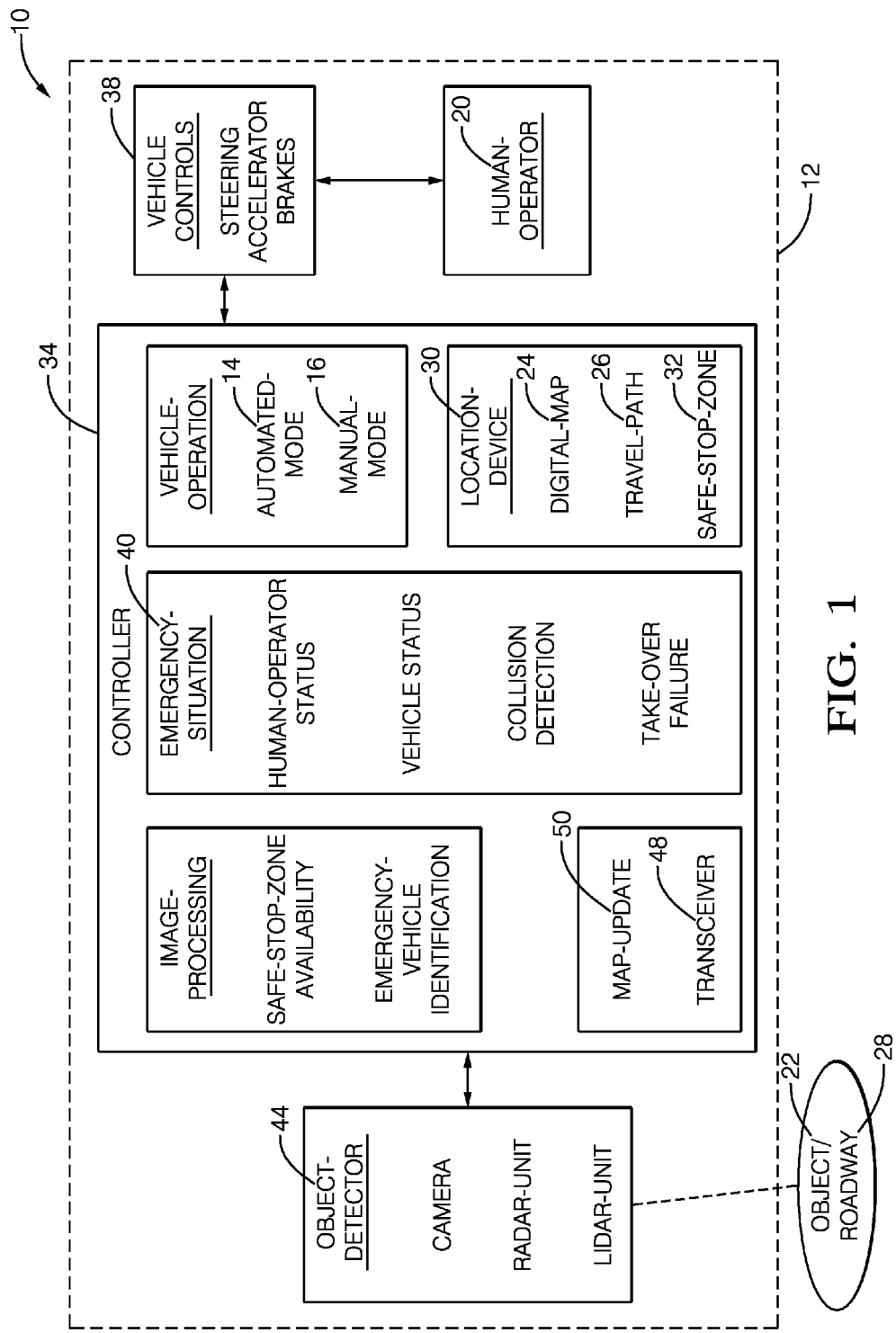
FIG. 1 is a diagram of a safe-stop-zone mapping system in accordance with one embodiment.

FIG. 1 illustrates a non-limiting example of a safe-stop-zone mapping system 10, hereafter referred to as the system 10, which is suitable for use on an automated-vehicle, for example a host-vehicle 12. Some examples presented herein are generally directed to instances when the host-vehicle 12 is being operated in an automated-mode 14, i.e. a fully autonomous mode, where a human-operator 20 of the host-vehicle 12 may do little more than designate a destination in order to operate the host-vehicle 12. However, it is contemplated that the teachings presented herein are useful when the host-vehicle 12 is operated in a manual-mode 16 where the degree or level of automation may be little more than providing steering advice to the human-operator 20 who is generally in control of the steering, accelerator, and brakes of the host-vehicle 12. For example, the system 10 may merely assist the human-operator 20 as needed to change lanes and/or avoid interference with and/or a collision with, for example, an object 22 such as an other-vehicle.

The system includes a digital-map 24 that could be stored on or in the host-vehicle 12, or could be stored remotely 'in-the-cloud' and accessed via a variety of wireless communications protocols such as dedicated-short-range-communications (DSRC), as will be recognized by those in the art. The digital-map 24 is generally configured or used to indicate a travel-path 26 (FIG. 2) suitable for travel by a host-vehicle 12, for example a roadway 28. In order to navigate the travel-path 26, the system 10 may include a location-device 30 such as a global-positioning-system receiver that can be used to determine the location or position of the host-vehicle 12 on the digital-map. Alternatively, the system 10 may determine the location or position of the host-vehicle 12 on the digital-map 24 using other means such as optical recognition of various features of the landscape proximate to the host-vehicle 12, and/or DSRC communications with various infrastructure transceivers. The digital-map 24 may include information about the roadway 28 such as a lane-width and/or a speed-limit of the roadway 28.

It has been recognized that situations arise while traveling that require or make it preferable that the host-vehicle 12 should stop, i.e. pull-over off the traveled portions of the roadway 28. However, it is recognized that it would generally be unsafe to just stop while still occupying a lane of the roadway 28. Accordingly, the digital-map 24 described herein is an improvement over previous examples as the digital-map 24 also indicates a safe-stop-zone 32 proximate to (i.e. adjacent to or nearby) the travel-path 26. As used herein, the safe-stop-zone 32 may be, but is not limited to, a shoulder 36 of the roadway 28. Alternative examples of the safe-stop-zone 32 include, but are not limited to, an exit-ramp, a rest-area, a parking-lot, and a side-street with parallel parking spots. The safe-stop-zone 32 can be generally characterized in many ways such as: zones or areas large enough to stop without creating dangerous situations with respect to other-vehicles; areas where stopping will not increase traffic congestion; areas where the least amount of congestion and danger will occur; areas where wireless communication to the host-vehicle 12 is not obstructed; safe stopping areas on the side of the roadway 28 that avoid illegal zones and times of no parking; safe freeway center-lanes and side-lanes; and sides or shoulders of highway areas large enough to accommodate the host-vehicle 12.

The system includes a controller 34 in communication with the digital-map 24. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for determining the location of the safe-stop-zone 32 relative to the present location of the host-vehicle 12 on the travel-path 26. The communication between the controller 34 and the digital-map 24 may be by way of wires if the digital-map 24 is part of or located within the controller 34, or may be by way of wireless communication if the digital-map 24 is located 'in-the-cloud'.

The controller 34 may be configured to generally navigate the host-vehicle 12 along the travel-path 26, and the degree of automation determines what steps the controller 34 takes to navigate the host-vehicle 12. For example, if the host-vehicle 12 is being operated in the automated-mode 14, the controller 34 may be fully in control of the vehicle-controls 38 so that the human-operator 20 is merely a passenger of the host-vehicle and navigation of the host-vehicle 12 includes the controller 34 operating the steering, accelerator, and brakes of the host-vehicle 12. However, if the host-vehicle 12 is being operated in the manual-mode 16, the controller 34 may merely provide a display of a map corresponding to the present location of the host-vehicle 12 with turn-by-turn guidance if a destination has been designated.

Since the digital-map 24 includes information about the location of one or more instances of the safe-stop-zone 32, the controller 34 is advantageously configured to navigate the host-vehicle 12 into the safe-stop-zone 32 when an emergency-situation 40 occurs. As used herein, the emergency-situation 40 may be, but is not limit to, an instance when the human-operator 20 needs the host-vehicle 12 to stop because the human-operator 20 is suffering from motion-sickness (human-operator status), an instance when the host-vehicle 12 is suffering from a mechanical failure, e.g. a flat-tire that should be fixed rather than continuing to travel (vehicle status), or following a collision of the host-vehicle 12 with the object 22 whereby the host-vehicle 12 should be inspected before continuing to travel (collision detection). The human-operator status may be reported or indicated to the controller 34 by, for example, a verbal command such as "pull-over and stop", or "find a safe place to stop" issued by the human-operator 20.

Once the emergency-situation 40 is indicated to or detected by the controller 34, the controller 34 navigates the host-vehicle 12 into the safe-stop-zone 32. If the host-vehicle 12 is being operated in the automated-mode 14, then the controller 34 may navigate the host-vehicle into the safe-stop-zone 32 by autonomously operating the vehicle-controls 38. If the host-vehicle 12 is being operated in the manual-mode 16, then the controller 34 may show on a navigation-display (not shown) viewable by the human-operator 20 the location of one or more instances of the safe-stop-zone 32, and/or issue an audible notification to the human-operator 20 such as "safe-stop-zone on right in two-hundred meters" and/or "steer onto the shoulder and then stop."

Figure 2:
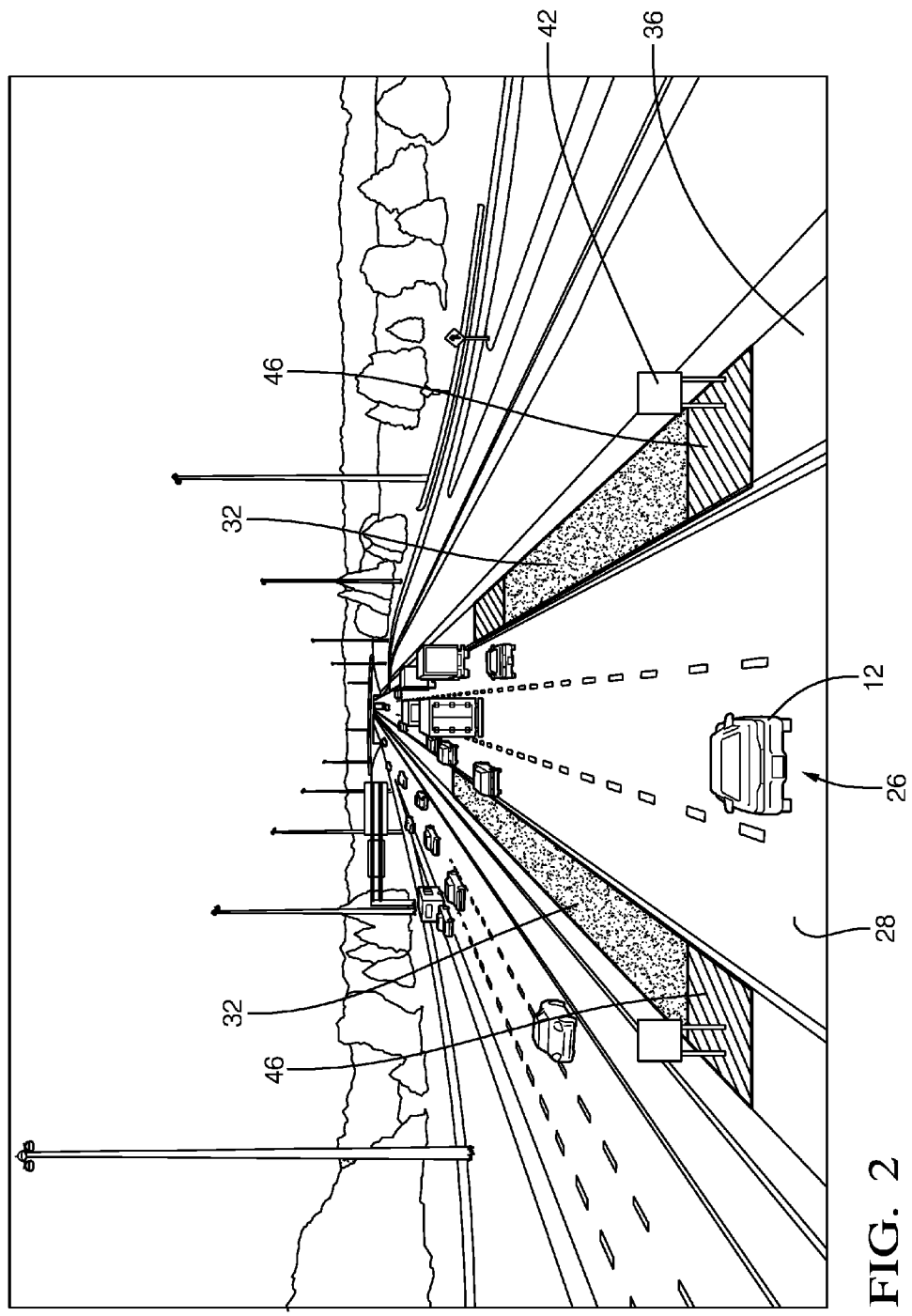
FIG. 2 is a traffic-scenario encountered by the system of FIG. 1 in accordance with one embodiment.

It is contemplated that instances may arise when an area designated as an instance of the safe-stop-zone 32 may be unexpectedly occupied by, for example, another vehicle, construction equipment, or a temporary-sign 42 (FIG. 2). In order to determine that an instance of the safe-stop-zone 32 is available for use by the host-vehicle, the system 10 may include an image-device 44 such as a camera, a radar-unit, a lidar-unit, or any combination thereof. The image-device 44 may be used by the controller 34 to determine if the safe-stop-zone 32 that host-vehicle 12 is about to enter is available for use by the host-vehicle 12. For example, if the image-device 44 detects the presence of the temporary-sign 42 in a portion of the shoulder 36 that the digital-map 24 indicates is or is part of an instance of the safe-stop-zone 32, then the controller 34 may be configured to look for the next instance of the safe-stop-zone 32, or what portion of the safe-stop-zone 32 is clear and thereby available for use by the host-vehicle 12.

The controller 34 may be further configured update the digital-map 24 when the safe-stop-zone 32 (or a portion thereof) is not available for use, e.g. is already occupied. For example, the controller 34 update the digital-map 24 to designate a portion of the shoulder 36 where the temporary sign 42 is located as a not-available-zone 46. If the digital-map 24 is stored 'in-the-cloud', the system 10 may include a transceiver 48 configured to send a map-update 50 to the digital-map 24 regarding the detection of the non-available-zone 46.

It is also contemplated that instances may arise when the host-vehicle 12 is being operated in the automated-mode 14, but for any of numerous reasons which are recognized by those in the art, it is advisable, preferable, or necessary to change the vehicle-operation to the manual-mode 16. By way of a non-limiting example, if the information provided by the digital-map 24 is insufficient or does not correspond sufficiently to what sensors for automated operation observe about the roadway, changing the vehicle-operation to the manual-mode 16 may be prudent. However, it is also contemplated that instances may arise when the human-operator 20 is unable to assume control of the host-vehicle 12. By way of a non-limiting example, the human-operator 20 may be sleeping, possibly not residing in the drivers-seat, or otherwise incapacitated and unable to assume control of the host-vehicle 12. As such, the controller 34 may be configured to continue to operate in the automated-mode 14 just long enough to navigate (i.e. autonomously operate the vehicle-controls 38) the host-vehicle 12 into the safe-stop-zone 32 when the manual-mode 16 for operation of the host-vehicle 12 is recommended and the human-operator 20 is unable to assume control of the host-vehicle 12.

Accordingly, a safe-stop-zone mapping system (the system 10), a controller 34 for the system 10, and a method of operating the system 10 is provided. The system 10 improves safety by providing information via the digital-map 24 regarding the safe-stop-zone 32 proximate to or adjacent to the travel-path 26 or roadway 28 traveled by the host-vehicle 12 so that, if necessary, the host-vehicle 12 can quickly locate and enter an instance of the safe-stop-zone 32.

While this invention has been described in terms of the preferred embodiments thereof, it is not intended to be so limited, but rather only to the extent set forth in the claims that follow.

We claim:

1. A safe-stop-zone mapping system suitable for use on an automated-vehicle, said system comprising:
    a digital-map that indicates a travel-path suitable for travel by a host-vehicle, wherein the digital-map also indicates a safe-stop-zone proximate to the travel-path; and
    a controller in communication with the digital-map, said controller configured to navigate the host-vehicle into the safe-stop-zone when an emergency-situation occurs, wherein the system includes an image-device used by the controller to determine if the safe-stop-zone is available for use by the host-vehicle, and the controller is configured update the digital-map when the safe-stop-zone is not available for use.

2. A safe-stop-zone mapping system suitable for use on an automated-vehicle, said system comprising:
    a digital-map that indicates a travel-path suitable for travel by a host-vehicle, wherein the digital-map also indicates a safe-stop-zone proximate to the travel-path; and
    a controller in communication with the digital-map, said controller configured to navigate the host-vehicle into the safe-stop-zone when an emergency-situation occurs, wherein the controller is configured to navigate the host-vehicle into the safe-stop-zone when manual-operation of the host-vehicle is recommended and a human-operator is unable to assume control of the host-vehicle.

3. The system in accordance with claim 1, wherein the controller is configured to determine that the safe-stop-zone is not available for use when an object is present in the safe-stop-zone.

4. The system in accordance with claim 2, wherein the controller is configured to operate the host-vehicle into the safe-stop-zone when manual-operation of the host-vehicle is recommended and a human-operator is unable to assume control of the host-vehicle.

5. The system in accordance with claim 2, wherein the controller is configured to steer the host-vehicle into the safe-stop-zone when manual-operation of the host-vehicle is recommended and a human-operator is unable to assume control of the host-vehicle.

\* \* \* \* \*